(12) United States Patent
Bernini

(10) Patent No.: US 6,625,029 B2
(45) Date of Patent: Sep. 23, 2003

(54) SENSOR UNIT

(75) Inventor: Michele Bernini, Parma (IT)

(73) Assignee: SKG Italiana SpA, Scarzara (IT)

( * ) Notice: Subject to any disclaimer, the term of this patent is extended or adjusted under 35 U.S.C. 154(b) by 40 days.

(21) Appl. No.: 09/972,587

(22) Filed: Oct. 6, 2001

(65) Prior Publication Data
US 2002/0053603 A1 May 9, 2002

(51) Int. Cl.$^7$ ................................................ H05K 7/00
(52) U.S. Cl. ...................... 361/728; 361/715; 361/727; 73/116; 73/726; 73/721; 73/727
(58) Field of Search .................... 73/706, 708, 756, 73/718, 724, 715, 723–727, 116, 726, 721; 361/728, 715, 727

(56) References Cited

U.S. PATENT DOCUMENTS

| | | | |
|---|---|---|---|
| 4,299,117 A | 11/1981 | Andrews et al. .............. 73/35 |
| 5,432,372 A | 7/1995 | Ohtani ....................... 257/419 |
| 6,176,138 B1 * | 1/2001 | Barr et al. .................... 73/756 |
| 6,282,966 B1 * | 9/2001 | Probst et al. ................. 73/715 |

FOREIGN PATENT DOCUMENTS

| | | |
|---|---|---|
| EP | 0 350 612 A2 | 1/1990 |
| EP | 0 839 676 A2 | 1/1999 |

* cited by examiner

Primary Examiner—David Martin
Assistant Examiner—Thanh Y. Tran
(74) Attorney, Agent, or Firm—Armstrong, Westerman & Hattori, LLP

(57) ABSTRACT

A sensor unit S for water heating systems, particularly for water boilers, is designed with a single housing H as a combined relative pressure and temperature sensor and has a ceramic support element C carrying an electronic circuit E including separate circuit zones E1, E2 for detecting the pressure and the temperature of the water, the support element including an active functional element M and being directly contacted by the water. The water contact area of said ceramic support element is separated from the electronic circuit E by a seal in the housing H.

5 Claims, 1 Drawing Sheet

SENSOR UNIT

BACKGROUND OF THE INVENTION

The invention relates to a sensor unit for a water heating system or a water boiler.

Water heating systems or water boilers conventionally are equipped with a manometer, a thermometer, a heating sensor like a NTC-sensor and a mechanical pressure sensor for monitoring and controlling the function. These are separate components mounted at different locations and need relatively high technical effort and a complicated cabling in order to reliably utilise the different information.

A combined pressure and temperature sensor unit as known from EP 0 893 676 A has a variable capacitor within a housing chamber. The capacitor consists of a disk-shaped ceramic substrate portion and a flexible diaphragm portion attached to the substrate portion in axially spaced apart and sealed relation with the diaphragm portion exposed to the fluid pressure and temperature in a sealed pressure chamber. Between the substrate portion and the diaphragm portion a glass sealing is provided. First and second apertures and formed through the diaphragm portion adjacent to the outer periphery. On the diaphragm portion a temperature responsive resistive element like a thick film layer of platinum is disposed in electric connection with probes situated within the first and second apertures in order to sense the temperature. A signal conditioning electronic circuit is situated in a separate housing chamber located above the disk-shaped substrate portion.

A sensor unit as known from EP 0 350 612 A for measuring the temperature and the pressure of a gaseous medium in a suction passage of an internal combustion engine contains in its housing a disk-shaped component having an integrated central membrane carrying a pressure sensor and a temperature sensor. Both sensors are electrically connected to a signal conditioning electronics provided inside the housing. The pressure sensor can be constituted by strain gauge strips or other known measuring elements detecting bending motions of the integrated membrane. The gaseous medium being measured is contacting the disk-shaped component exclusively at the restricted area of the membrane sealed by a central sealing ring. A further sealing ring is placed on top of the upper surface of the disk-shaped element.

Further prior art is contained in U.S. Pat. No. 5,432,372A and U.S. Pat. No. 4,299,117A.

It is an object of the invention to create a sensor unit which can be manufactured with fair costs, has multiple functions in a water heating system or a water boiler, has a reduced mounting requirement and is able to generate precise information reliably and rapidly.

SUMMARY OF THE INVENTION

A sensor unit allows simultaneous detection of the water pressure and temperature variations or temperature values. The ceramic support element is in direct contact with the water and comprises an active functional element responding by deformation to water pressure variations. The electronic circuit provides information on the water pressure and the water temperature rapidly and precisely, thanks to the excellent response behaviour of the ceramic support element to temperature and its sensitivity to pressure variations. At least for detecting the water pressure an Application Specific integrated Circuit (ASIC) is used instead of traditional electronics. This equipment assures that the sensor compensates for dimensions in terms of changing with the temperature and linearity for maintaining the output chacteristic within predetermined limits. Gauging is made by writing parameters into an integrated memory. The sensor unit can be mounted in a simple fashion, e.g. on a water boiler. The sensor unit is characterised by a small hysteresis and for that reason is an ideal component for heating applications, particularly boilers. The sensor unit replaces four components as needed in the past, namely the manometer, the thermometer, the heating sensor and the mechanical pressure sensor. This leads to a significant cost reduction.

At least one NTC-sensor (temperature sensitive element operating with a negative temperature coefficient) and/or SMD-chip-thermistor (a temperature sensitive, electronic member operating with positive or negative temperature coefficient and being mounted according to the SMD-technique, i.e. at the surface of ceramic support element) are capable of generating clear signal variations between e.g. 0 and 4 volts in a relatively short response times of less than or equal to 3 ms within a temperature range of e.g. −400 to 140° C. in a reliable fashion. Such components, furthermore, are capable of maintaining a drift-temperature-zone point of ±0.05% FS/° C. at a drift temperature sensitivity of ±0.01% FS/° C. in connection with a relatively high preciseness (linearity, hysteresis, repeatability) of ±1% FS and a zero point tolerance of only ±1.5% FS. The electronic circuit zone employed to detect the pressure of the water by means of the active functional element of the ceramic support element should at least be equipped with a resistor, at least one capacitor and at least one microprocessor in order to generate precise signals within a pressure range of e.g. 0 to about 6 bar, while the sensor unit can stand an upper pressure limit of about 12 bar. The ceramic support element offers the advantage of allowing relatively temperature independent pressure measurements.

Expediently the active working element of the ceramic support element may be an integrated membrane which is deformed by the water pressure and which is scanned by electronic members, e.g. by strain gauge elements connected to a Wheatstone bridge. The electronic members expediently are provided at the dry side of the support element. The electric circuit compensates for variations of the Wheatstone bridge caused by temperature variations. Hysteresis cycling and linearity <0.8 F.S can be achieved with an output at zero bar of about 200 mV ±1.5 F.S.

It is of advantage when the ceramic support element has the shape of a circular disk containing an integrated and circular membrane in its central region. The material of the ceramic support element may be aluminum oxide, e.g. with a purity of about 96%. The outer diameter of the support element can be about 26 mm and its thickness about 6 mm.

The ceramic support element is secured in its edge region and also is sealed in this region such that no water can reach the electronic circuitry. The inner portion of the support element remains moveable in relation to the fixation of the support element, particularly the limited inner portion defining the membrane and which is actuated by the water pressure. The ceramic support element serves as the carrier for the electronic circuit zones. Expediently a temperature sensitive electronic member is provided outside the limited inner portion at or within the ceramic support element which member is used to detect the temperature of the water. In this case, the ceramic material of the support element serves to transfer the temperature towards the member.

In view to manufacturing it is of advantage to integrate the ceramic support element already equipped with the electronic circuit as a prefabricated chip body during assembly or when injection moulding the housing of the sensor unit.

The sealing can be at least one sealing frame or O-ring made of EPDM plastic material because the material maintains its excellent sealing capabilities within a relatively wide temperature and pressure ranges.

The housing of the sensor unit expediently is, e.g., a unitary or manifold plastic material injection form part consisting of an upper part and a lower part.

For specific conditions the housing can be made at least in part of brass.

The ceramic support element expediently is fixed within a cavity of the housing. The inner channel leads to said cavity in order to actuate the support element with the pressure and the temperature of the water. The securing ring or support element retainer of the housing holds the support element against movement out of the cavity.

BRIEF DESCRIPTION OF THE DRAWINGS

An embodiment of the subject of the invention is explained with the help of the drawings. In the drawings.

DETAILED DESCRIPTION

Figure 1:
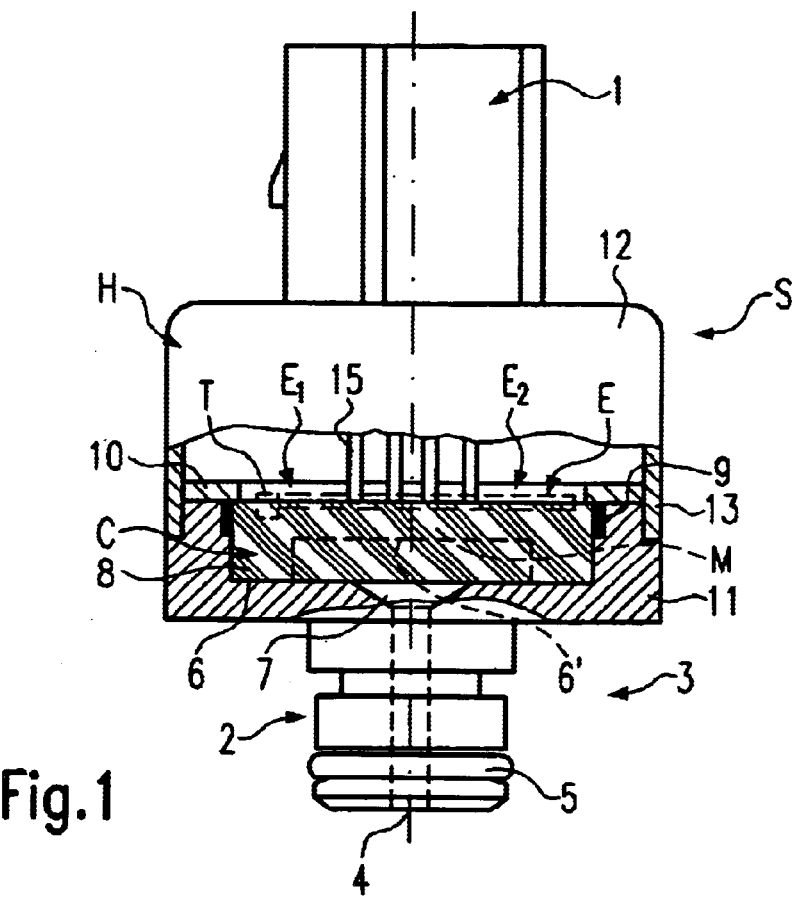
FIG. 1 is a schematic partial longitudinal section of a sensor unit.
Figure 2:
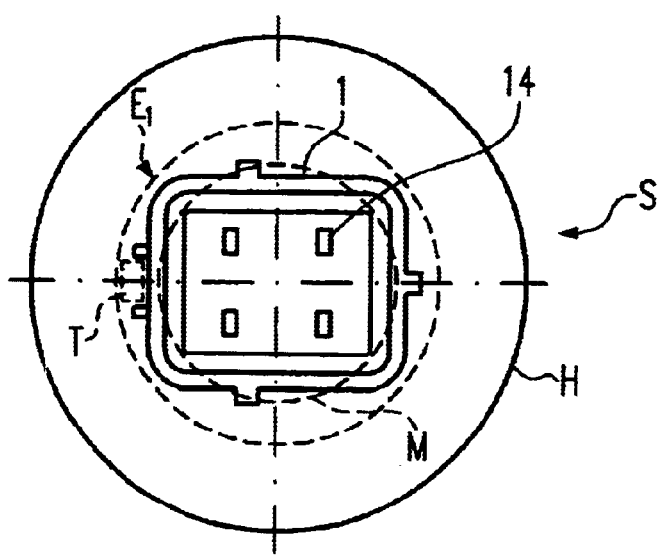
FIG. 2 is a top view of the sensor unit.

A sensor unit S, particularly for a water heating system or for a water boiler (not shown), respectively, has in FIGS. 1 and 2 a housing H made of plastic material or brass in which a disk-shaped ceramic support element C is received at the upper surface of which an electronic circuit E is placed such that support element C serves as a carrier of the electronic circuit E. Expediently the ceramic support element C equipped with the electronic circuit E is a prefabricated chip body 8, e.g. having an outer diameter of about 26 mm and a thickness of about 6 mm. Into the ceramic support element C as an active functional element a membrane M is integrated, e.g. as a central and round portion at the centre of support element C.

The housing may be a unitary injection moulded form part or can be combined of two injection mould form parts, as shown for the embodiment with an upper part 12 and a lower part 11. Upper part 12 is formed with a shaft-like connector socket 1 in the inner region of which connecting contacts 14 (FIG. 2) are provided. In the shown embodiment there are four contacts 14 at the ends of four connecting lines 15 extending upwardly from the electronic circuit E (power supply, ground, connector for pressure signal and connector for temperature signal).

A water introducing fitting 2 is unitarly formed at lower part 11 and carries at least one O-ring 5 for sealing purposes and has an inner channel 4 extending into a funnel-shaped portion 7 at the bottom of cavity 6 formed in lower part 11, preferably in a central position. The ceramic support element C is received within cavity 6 and is held by a sealing 9 at its outer edge (the sealing may be a sealing frame or O-ring made of EDPM plastic material), such that the lower side 6' of the support element C directly contacted by the water is sealed against the electronic circuit E provided at the upper side of the support element. A fixing ring or retainer 10 of housing H is extending from outside beyond the edge of the cavity 6 and also the outer edge of support element C in order to secure it within cavity 6.

The electronic circuit has two separate circuit zones E1, E2. Circuit zone E1 serves to measure the temperature, e.g. by means of a NTC-sensor and/or a MSD-chip-thermistor T. The other circuit zone E2 serves to measure the water pressure by scanning the active working element, i.e. the membrane M, integrated into support element C. In the shown embodiment upper and lower parts 11, 12 are interconnected in a region of a skirt 13. In case of a unitary design of housing H upper and lower parts 11, 12 would be interconnected unitarily.

At least one resistor, at least one capacitor and at least one microprocessor (not shown in detail) are provided within circuit zone E2, which as such may be a traditional electronic circuit. Even circuit zone E1 should have a microprocessor. Expediently there are several capacitors and a group of resistors like strain gauge elements connected to a Wheatstone bridge provided in circuit zone E2 on the dry surface of support element C. The electric conductors and the electronic components of the electronic circuit E are distributed on the surface of support element C, the central region of which is defining the membrane M as the active functional element in co-action with e.g. the strain gauge elements. Gauging or calibrating is carried out by writing parameters into integrated memories.

Instead, circuit zone E2 or even also circuit zone E1 could be designed as an Application Specific integrated circuit (ASIC). Then the sensor could compensate for dimension variations in terms of changing with temperature and linearity for maintaining the output characteristics within predetermined limits.

Lower part 11 has further not shown parts of a sensor fixation 3, e.g. a threaded projection or a holder for a fixing screw.

The sensor unit S being a combined temperature and pressure sensor for the water brought through inner channel 4 to support element C is inserted into a corresponding mounting facility, e.g. at a hot water boiler, by its water connecting fitting 2 and is fixed into position. A connector inserted into connector socket 1 is snapped in position in order to connect the sensor unit with the control system or the monitoring system of the water heating system or the boiler.

What is claimed is:

1. A sensor for sensing water temperature and water pressure in a water boiler,
    wherein said sensor arrangement is a combined pressure and temperature sensor unit provided in a single housing,
    said housing containing a ceramic support element having a water contact side which is freely accessible by water inside an open cavity provided inside said housing,
    said ceramic support element carrying an electronic circuit comprising separated first and second electronic circuit zones on a dry side sealed from said water contact side by a sealing arranged in said cavity inside said housing,
    said ceramic support element comprising a temperature sensing NTC-sensor or a SND-chip thermistor connected to said first electronic circuit zone, said ceramic support element being formed with an integrated membrane which is deformable by pressure on said water contact side and which carries on the dry side of the ceramic support element electronic components responding to pressure depending membrane deformations,
    said electronic components being connected to said second electronic circuit zone,
    said electronic components and said second electronic circuit zone serve to detect water pressure being constituted by an Application Specific Integrated Circuit (ASIC), and wherein said ceramic support element with said electronic circuit and said respective pressure detecting and temperature sensing electronic components being integrated into a prefabricated electronic chip body.

2. The sensor arrangement as in claim 1, wherein said ceramic support element has the shape of a circular disk with said membrane formed in circular shape within the central region of said support element.

3. The sensor arrangement as in claim 1, wherein said housing consists of a plastic material upper part connected in a sealing fashion with a plastic material lower part, both parts being injection moulded form parts, wherein a shaft-like connector socket is provided with in-built electronic contacts in said upper part, and wherein an integrated hollow water connecting fitting and at least a part of a sensor fixation are provided at said lower part.

4. The sensor arrangement as in claim 1, wherein said housing at least in parts consists of brass.

5. The sensor arrangement as in claim 1, wherein a retainer is provided in said cavity of said housing, the retainer extending from outside over an edge region of said upper dry side of said ceramic support element.

\* \* \* \* \*